(12) United States Patent
Miller

(10) Patent No.: US 8,857,375 B1
(45) Date of Patent: Oct. 14, 2014

(54) QUICK DISPOSABLE CAT LITTER

(75) Inventor: Sidney H. Miller, Carlisle, PA (US)

(73) Assignee: Sidney H. Miller, Carlisle, PA (US)

( * ) Notice: Subject to any disclaimer, the term of this patent is extended or adjusted under 35 U.S.C. 154(b) by 211 days.

(21) Appl. No.: 13/065,429

(22) Filed: Mar. 21, 2011

Related U.S. Application Data

(63) Continuation-in-part of application No. 12/455,850, filed on Jun. 8, 2009, now abandoned.

(60) Provisional application No. 61/458,389, filed on Nov. 23, 2010.

(51) Int. Cl.
*A01K 1/01* (2006.01)

(52) U.S. Cl.
USPC .......................................................... 119/165

(58) Field of Classification Search
USPC ......... 119/165, 167, 169, 170, 171, 172, 173; 264/131; 36/17, 111
See application file for complete search history.

(56) References Cited

U.S. PATENT DOCUMENTS

| | | | | |
|---|---|---|---|---|
| 2,505,176 A * | 4/1950 | Elder | ................. | 112/411 |
| 3,486,485 A * | 12/1969 | Kahanick | ................. | 119/706 |
| 3,752,121 A * | 8/1973 | Brazzell | ................. | 119/169 |
| 3,827,401 A | 8/1974 | Franzl | | |
| 4,308,825 A | 1/1982 | Stepanian | | |
| 4,360,557 A * | 11/1982 | Miller | ................. | 428/142 |
| 4,819,580 A | 4/1989 | Foldes | | |
| 4,869,204 A | 9/1989 | Yananton | | |
| 5,143,023 A | 9/1992 | Kuhns | | |
| 5,158,042 A | 10/1992 | Hammerslag | | |
| 5,564,365 A * | 10/1996 | Kacic | ................. | 119/165 |
| 5,630,377 A * | 5/1997 | Kumlin | ................. | 119/172 |
| 5,730,084 A * | 3/1998 | Kacic | ................. | 119/165 |
| 5,730,085 A * | 3/1998 | Santoiemmo | ................. | 119/168 |
| 5,797,352 A * | 8/1998 | Ebert | ................. | 119/652 |
| 5,814,327 A | 9/1998 | Ito et al. | | |
| 6,183,677 B1 * | 2/2001 | Usui et al. | ................. | 264/131 |
| 6,357,388 B1 * | 3/2002 | Holtrop et al. | ................. | 119/28.5 |
| 6,401,436 B2 * | 6/2002 | Weder | ................. | 53/449 |
| 6,405,678 B2 | 6/2002 | Ikegami et al. | | |
| 6,415,738 B1 * | 7/2002 | Hotter | ................. | 119/165 |
| 6,439,160 B1 * | 8/2002 | Wheelwright | ................. | 119/165 |
| 6,534,136 B2 * | 3/2003 | Weder | ................. | 428/34.1 |
| 6,578,520 B2 | 6/2003 | Otsuji et al. | | |
| 6,684,816 B2 * | 2/2004 | Lippincott | ................. | 119/171 |
| 6,863,033 B1 * | 3/2005 | Fleming | ................. | 119/850 |
| 6,976,451 B2 * | 12/2005 | Helfman | ................. | 119/169 |
| 6,983,720 B2 * | 1/2006 | Lakela | ................. | 119/165 |
| 6,994,469 B2 | 2/2006 | Sleight et al. | | |
| 7,007,635 B2 | 3/2006 | Kincaid | | |
| 7,111,585 B2 * | 9/2006 | Hale et al. | ................. | 119/652 |
| 7,392,765 B2 * | 7/2008 | Lingmann | ................. | 119/526 |
| 7,726,260 B1 * | 6/2010 | Yananton | ................. | 119/171 |
| 7,891,320 B2 * | 2/2011 | Otsuji et al. | ................. | 119/169 |

* cited by examiner

*Primary Examiner* — Yvonne Abbott

(57) ABSTRACT

A litter box system comprises an imitation bed of loose cat litter that includes a layer of actual cat litter granules bonded to a sheet of flexible material. In some examples, the relative thicknesses of the sheet of material and the layer of cat litter is such that the imitation bed of loose cat litter has substantial urine holding capacity yet remains sufficiently flexible. In some examples, the sheet of material includes an image of loose cat litter underneath the bonded layer of cat litter so that if some of the cat litter layer is scratched off, the imitation bed will still appear to be fully covered with cat litter granules. In some examples, the sheet of material includes integrally formed bumps that resemble cat litter granules.

12 Claims, 5 Drawing Sheets

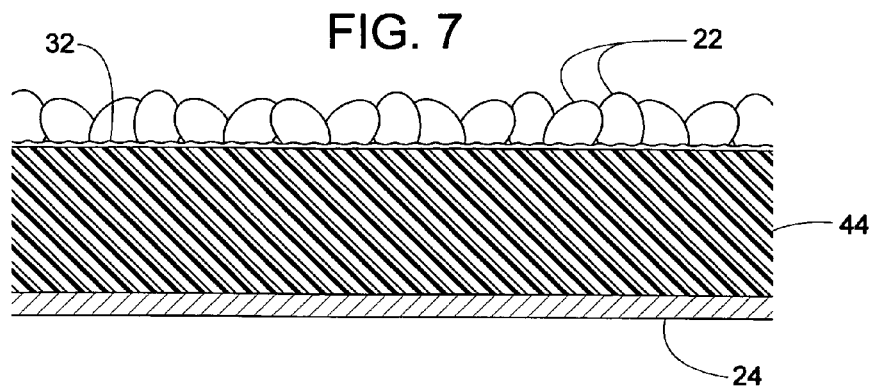
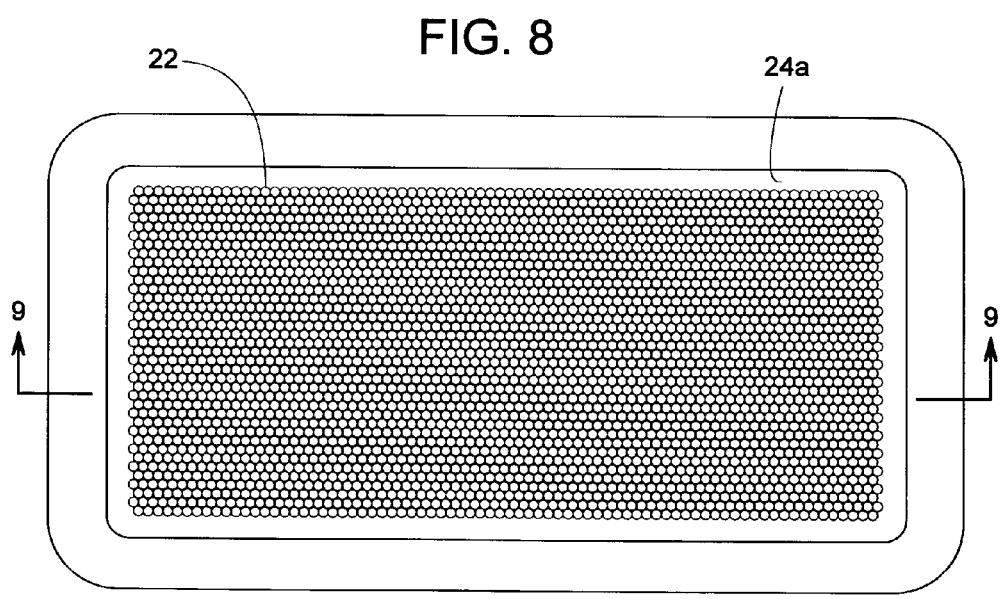
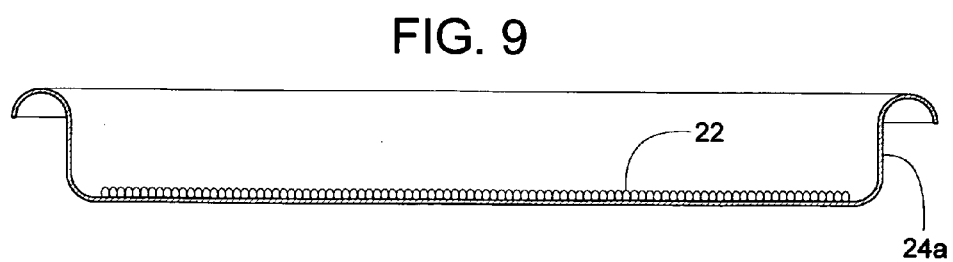

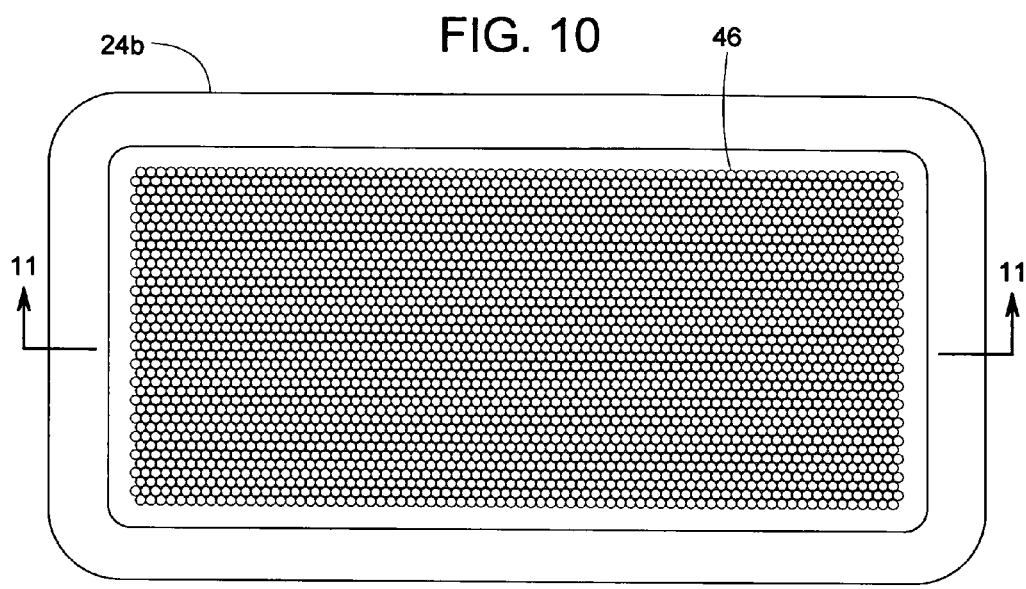
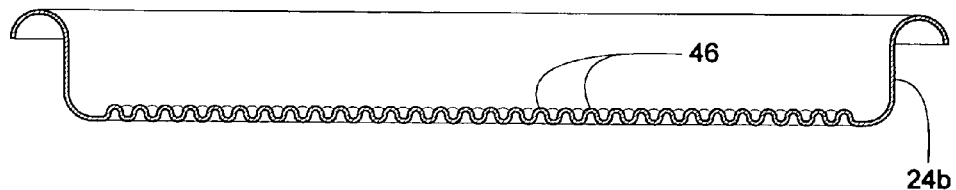
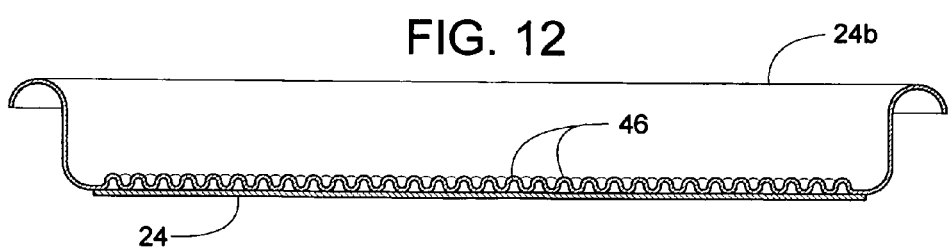

QUICK DISPOSABLE CAT LITTER

CROSS REFERENCE TO RELATED APPLICATIONS

This application is a continuation-in-part of U.S. Ser. No. 12/455,850 filed on Jun. 8, 2009 now abandoned and claiming the benefit of provisional patent application Ser. No. 61/458,389 filed on Nov. 23, 2010 by the present inventor.

FIELD OF THE DISCLOSURE

The subject invention generally pertains to cat litter boxes and more specifically to a convenient and sanitary means for handling the cat litter.

BACKGROUND

Common cat litter can be messy and unsanitary to handle. Examples of cat litter and/or its alternatives are disclosed in the following U.S. Pat. Nos. 3,827,401; 3,752,121; 5,630,377; 6,405,678; and 5,730,084.

BRIEF DESCRIPTION OF THE DRAWINGS

FIG. 7 is a cross-sectional view similar to FIG. 6 but showing an absorbent pad underneath the cat litter granules.

FIG. 8 is a top view of another example litter box system.

FIG. 9 is a cross-sectional view taken along line 9-9 of FIG. 8.

FIG. 10 is a top view of another example litter box system.

FIG. 11 is a cross-sectional view taken along line 11-11 of FIG. 10.

FIG. 12 is a cross-sectional view similar to FIG. 11 but showing an underlying sheet with a cat litter image that shows up through the bottom of the contoured sheet of FIG. 11.

DETAILED DESCRIPTION

Figure 1:
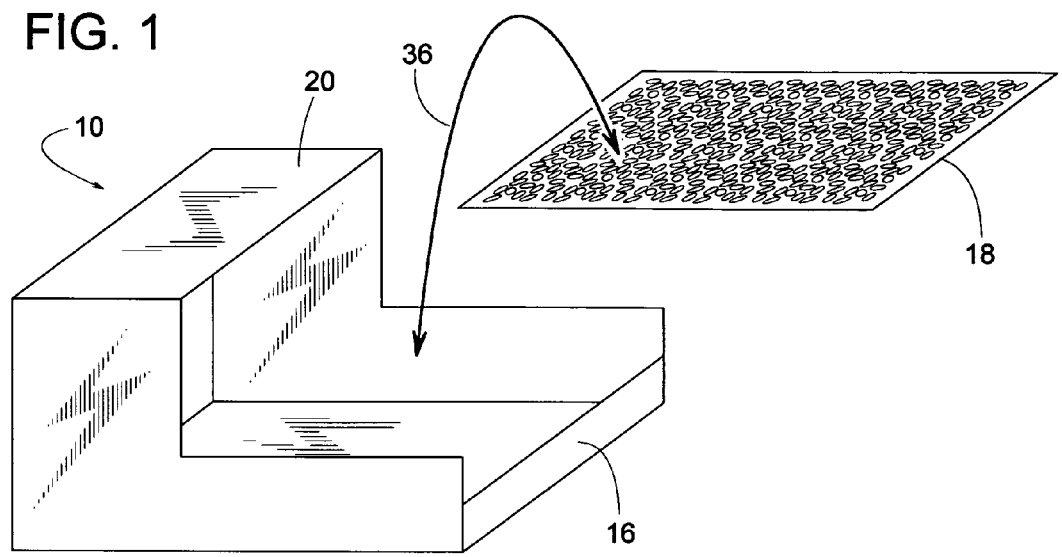
FIG. 1 is an exploded perspective view of one example litter box system.
Figure 2:
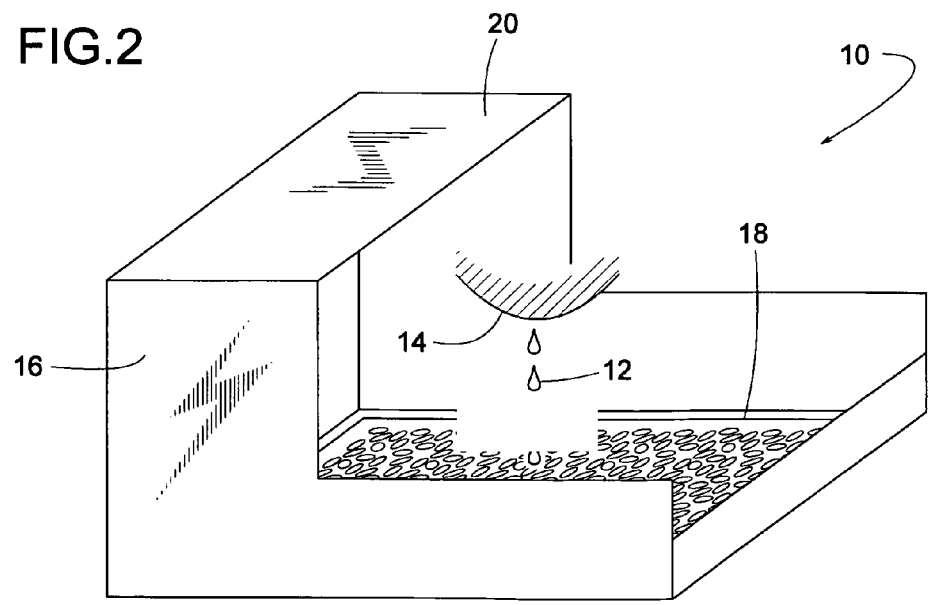
FIG. 2 is perspective view showing an animal using the example litter box system.
Figure 3:
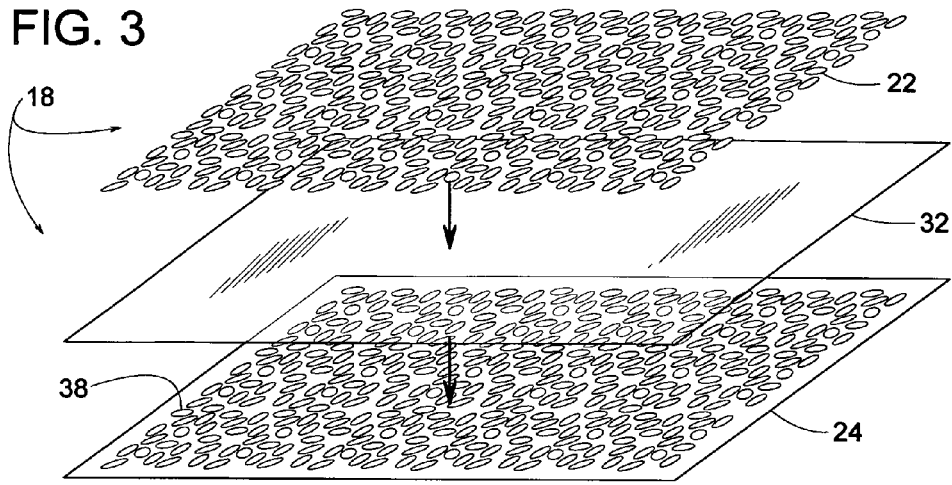
FIG. 3 is an exploded view of an example imitation bed of loose cat litter.
Figure 4:
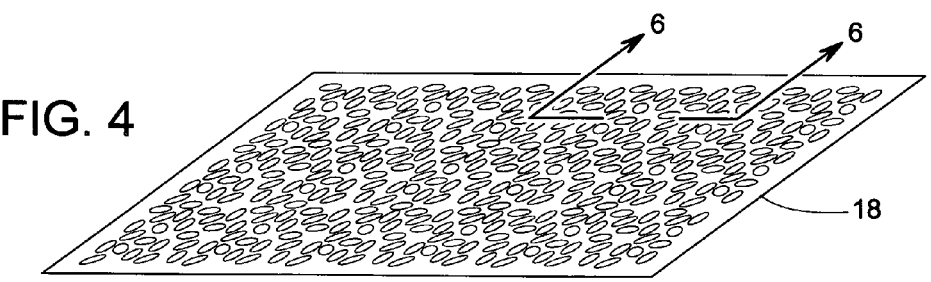
FIG. 4 is a perspective view of the example imitation bed of loose cat litter.

FIGS. 1 and 2 illustrate a litter box system 10 for collecting urine 12 from an animal 14 (e.g., cat, dog, other pets, etc.). In some examples, litter box system 10 comprises a container 16 and an imitation bed 18 of loose cat litter. In some examples, container 16 is an open tray (e.g., similar to a cookie sheet or cake pan), and in other examples, container 16 has a roof 20 that extends at least partially over bed 18. The expression, "loose cat litter" refers to a free unbounded collection of liquid-absorbent granules 22 (FIG. 3), wherein such cat litter can be used for absorbing urine 12 from any animal, not just cats. For sake of a clear definition, cat litter granules have a particle size of between one and ten millimeters across. The expressions, "cat litter" and "kitty litter" are equivalent and used interchangeably herein. Cat litter granules have a particle size The term, "imitation" as used with reference to a bed of loose cat litter means that the so-called imitation visually resembles a bed of loose cat litter but the cat litter granules are actually bonded or otherwise fixed in place rather than being loose.

Referring further to FIGS. 3-6, some examples of system 10 include a sheet of material 24 of a predetermined thickness 26. In some examples, sheet 24 is a paper-based product. In some examples, sheet 24 is substantially impervious to liquid so that urine 12 does not readily leak through it. Examples of sheet 24 include, but are not limited to polymer coated paper, polymer coated cardboard, uncoated absorbent sheet of material, flexible plastic sheet, etc.

In some examples, system 10 includes the collection of liquid-absorbent granules 22 (e.g., cat litter) having an upper surface 28 and a lower surface 30. In some examples, an adhesive 32 (e.g., contact cement, glue, wax, etc.) bonds lower surface 30 to the upward facing surface of sheet 24 to produce the imitation bed 18 of loose cat litter. To inhibit urine 12 from readily flowing off the outer edges of sheet 24, liquid-absorbent granules 22 are made of liquid absorbent clay. To prevent bed 18 from being an abrasive irritant to the claws of animal 14, granules are softer and less abrasive than sand. The term, "sand" encompasses silicon dioxide and aluminum oxide. Some examples of granules 22 include, but are not limited to, clay, zeolite, diatomite, sepiolite, bentonite clay, diatomaceous, and various mixtures thereof because such examples seem particularly effective at absorbing moisture.

Figure 6:
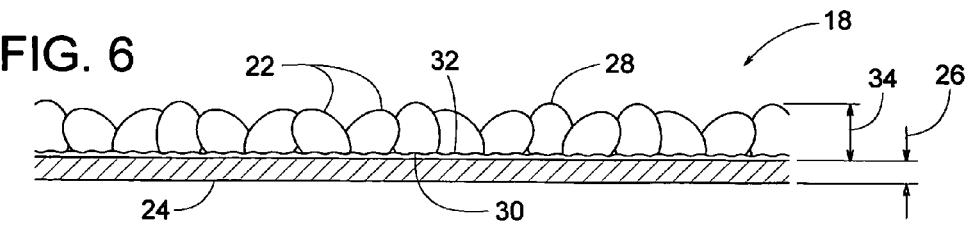
FIG. 6 is a cross-sectional view taken along line 6-6 of FIG. 4.

In some examples, adhesive 32 bonds a substantially single layer of the liquid-absorbent granules 22 to sheet 24, as shown in FIG. 6. In some examples, the substantially single layer is a certain thickness 34, and sheet 24 has a predetermined thickness 26 that is less than the certain thickness 34 of the substantially single layer of liquid-absorbent granules 22. The relative thicknesses of sheet 24 and the layer of granules 22 ensure the flexibility of bed 18 while maintaining ample capacity to hold urine 12. To readily replace bed 18, arrow 36 (FIG. 1) shows bed 18 being removably disposed within container 16 with upper surface 28 (FIG. 6) of the liquid-absorbent granules 22 being uncovered and fully exposed within container 16 to receive unimpeded urine 12 directly from animal 14 (FIG. 2). The expression, "uncovered and fully exposed" does not pertain to roof 20 but instead means that urine 12 falls directly from animal 14 onto granules 22 rather than having to first pass through some intermediate layer of material that would otherwise overlay and impede the flow of urine 12 onto granules 22.

Figure 5:
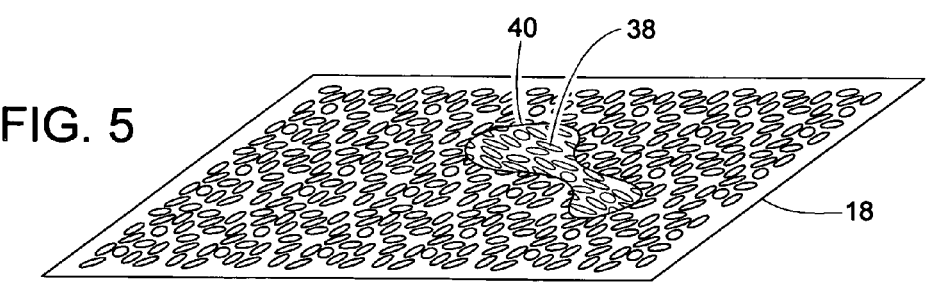
FIG. 5 is a perspective view similar to FIG. 4 but showing an image of granules in at a bare spot in the imitation bed of loose cat litter.

In some examples, sheet 24 includes a printed image 38 of liquid-absorbent granules thereon such that sheet 24 would at least appear to be fully covered with the liquid-absorbent granules 22 even if the liquid-absorbent granules 22 failed to fully cover sheet 24 (e.g., a cat might scratch some granules off of sheet 24). FIG. 5, for example, shows a bare section 40 on sheet 24 where granules 22 fail to cover sheet 24 in that area; however, image 38 still makes sheet 24 appear to be fully covered with granules 22. Examples of image 38 include, but are not limited to, a drawing, a photograph, etc.

In some examples, as shown in FIG. 7, an absorbent pad 44 is interposed between the liquid-absorbent granules 22 and sheet 24, wherein adhesive 32 bonds granules 22 to pad 44.

In some examples, as shown in FIGS. 8 and 9, granules 22 are bonded to a contoured sheet of material 24a.

In some examples, as shown in FIGS. 10 and 11, a sheet of material 24b is formed (e.g., vacuum formed, plastic injection molded, etc.) to include a plurality of bumps 46 that resemble cat litter (e.g., granules 22).

In some examples, as shown in FIG. 12, sheet 24b is transparent (i.e., at least partially see-through), and an image 38 of cat litter (e.g., FIGS. 3 and 5) is disposed underneath sheet 24b so that image 38 shows through sheet 24b.

Figure 13:
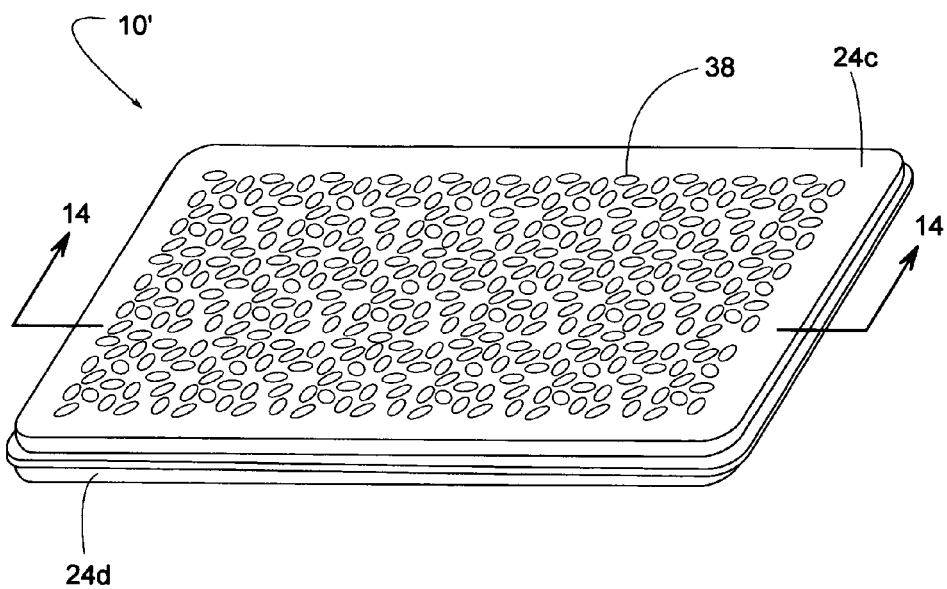
FIG. 13 is a perspective view of another example litter box system.
Figure 14:
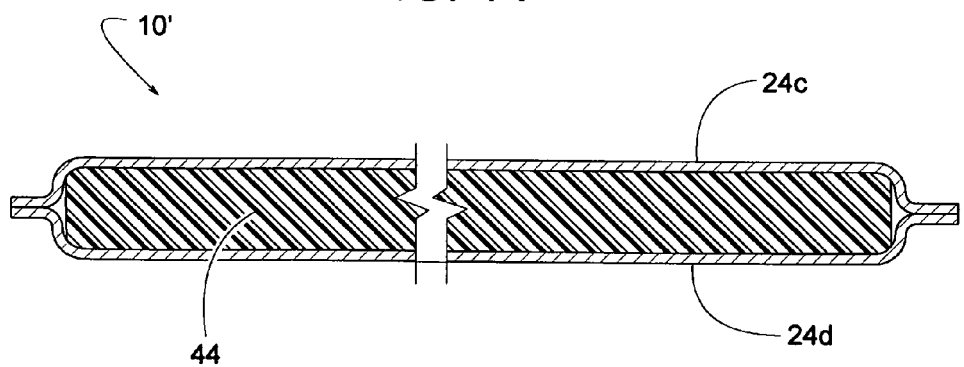
FIG. 14 is a cross-sectional view taken along line 14-14 of FIG. 13.

In some examples, as shown in FIGS. 13 and 14, a litter box system 10' comprises an absorbent pad 44 sandwiched between two sheets of pliable material 24c and 24d. In some examples, pad 44 is considered to include sheets 24c and 24d. An image 38 of kitty litter granules 22 is printed on sheet 24c to entice cats to relieve themselves thereon. In this example, sheet 24c is liquid permeable to pass urine 12 into pad 44 (i.e., into the relatively thick absorbent part between sheets 24c and 24d). In some examples, sheet 24d is substantially impermeable to help trap urine 12 in pad 44. In some examples, system 10' is removably installed in container 16.

Although the invention is described with respect to a preferred embodiment, modifications thereto will be apparent to those of ordinary skill in the art. The scope of the invention, therefore, is to be determined by reference to the following claims.

The invention claimed is:

1. A litter box system for collecting urine from an animal, the litter box system comprising:
 a container;
 a sheet of material;
 a plurality of granules having an upper surface and a lower surface; and
 an adhesive coupling the lower surface of the plurality of granules to the sheet of material to produce an imitation bed of loose cat litter, the imitation bed of loose cat litter being removably disposed within the container with the upper surface of the plurality of granules being uncovered and fully exposed within the container to receive unimpeded the urine directly from the animal, the sheet of material includes an image of the plurality of granules thereon such that the sheet of material would at least appear to be fully covered with the plurality of granules even if the plurality of granules fail to fully cover the sheet of material.

2. The litter box system of claim 1, wherein the sheet of material is impervious to liquid.

3. The litter box system of claim 1, wherein the plurality of granules include clay.

4. The litter box system of claim 1, wherein the plurality of granules include zeolite.

5. The litter box system of claim 1, wherein the plurality of granules include diatomite.

6. The litter box system of claim 1, wherein the plurality of granules include sepiolite.

7. The litter box system of claim 1, wherein the plurality of granules include bentonite clay.

8. The litter box system of claim 1, wherein the plurality of granules include diatomaceous earth.

9. The litter box system of claim 1, wherein the plurality of granules are distributed in a substantially single layer of granules over the sheet of material.

10. The litter box system of claim 1, wherein the plurality of granules are softer and less abrasive than sand.

11. The litter box system of claim 1, wherein the sheet of material is formed by a process of injection molding.

12. The litter box system of claim 1, wherein the sheet of material is formed by a process of vacuum molding.

* * * * *